(12) United States Patent
Hammad et al.

(10) Patent No.: US 10,026,032 B2
(45) Date of Patent: *Jul. 17, 2018

(54) DYNAMIC AUTHENTICATION SYSTEM AND METHODS FOR USE WITH LEGACY TERMINALS

(71) Applicant: Carneros Bay Capital, LLC, San Francisco, CA (US)

(72) Inventors: Ayman Hammad, Pleasanton, CA (US); Mark Carlson, Half Moon Bay, CA (US)

(73) Assignee: Cameros Bay Capital, LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/608,121

(22) Filed: May 30, 2017

(65) Prior Publication Data
US 2017/0262746 A1   Sep. 14, 2017

Related U.S. Application Data

(63) Continuation of application No. 15/197,470, filed on Jun. 29, 2016, now Pat. No. 9,691,012.

(60) Provisional application No. 62/186,166, filed on Jun. 29, 2015.

(51) Int. Cl.
| | |
|---|---|
| *G06K 19/06* | (2006.01) |
| *G06K 19/073* | (2006.01) |
| *G06K 7/08* | (2006.01) |
| *G07F 7/10* | (2006.01) |
| *G06Q 20/42* | (2012.01) |
| *G06Q 20/32* | (2012.01) |

(Continued)

(52) U.S. Cl.
CPC ....... *G06K 19/06206* (2013.01); *G06K 7/084* (2013.01); *G06K 19/07354* (2013.01); *G06Q 20/20* (2013.01); *G06Q 20/3229* (2013.01); *G06Q 20/3278* (2013.01); *G06Q 20/38215* (2013.01); *G06Q 20/425* (2013.01); *G07F 7/10* (2013.01)

(58) Field of Classification Search
CPC .......... G06K 19/06; G06K 19/00; G06K 5/00; G06F 17/00
USPC ................................ 235/492, 487, 380, 375
See application file for complete search history.

(56) References Cited

U.S. PATENT DOCUMENTS

| | | | | |
|---|---|---|---|---|
| 2008/0005037 A1* | 1/2008 | Hammad | ............. | G06Q 20/085 705/67 |
| 2009/0048971 A1* | 2/2009 | Hathaway | ............ | G06Q 20/105 705/41 |

(Continued)

*Primary Examiner* — Edwyn Labaze
(74) *Attorney, Agent, or Firm* — Kilpatrick Townsend & Stockton LLP

(57) ABSTRACT

In one embodiment, the present invention provides a method and communication device with an emulated mag stripe capability. Information is transmitted in the mag stripe data indicating that the communication device has chip capability as well. This information is used by a server on the back-end (acquirer, issuer, network) to take advantage of that chip capability. For example, additional fields can be used for security measures and communication over the telecommunications network with the device can be performed to provide a more secure communication with a terminal. In one embodiment, the additional information is provided in the service code, using a unique 3 digit code other than 2xx.

20 Claims, 5 Drawing Sheets

(51) Int. Cl.
*G06Q 20/38* (2012.01)
*G06Q 20/20* (2012.01)

(56) References Cited

U.S. PATENT DOCUMENTS

| | | | |
|---|---|---|---|
| 2011/0140841 A1* | 6/2011 | Bona | G06K 19/06187 340/5.83 |
| 2013/0098984 A1* | 4/2013 | Shenker | H04W 8/20 235/375 |
| 2013/0117186 A1* | 5/2013 | Weinstein | G06Q 20/12 705/67 |
| 2015/0073983 A1* | 3/2015 | Bartenstein | G06Q 20/3415 705/41 |

* cited by examiner

DYNAMIC AUTHENTICATION SYSTEM AND METHODS FOR USE WITH LEGACY TERMINALS

CROSS-REFERENCES TO RELATED APPLICATIONS

This application is a continuation of U.S. patent application Ser. No. 15/197,470, entitled "Dynamic Authentication System and Methods for Use with Legacy Terminals, filed Jun. 29, 2016 which is nonprovisional patent application of Ser. No. 62/186,166 entitled "Systems and Methods for Digital Payments," filed on Jun. 29, 2015, the disclosures of which are hereby incorporated in their entirety.

BACKGROUND OF THE INVENTION

The present invention relates to dynamic authentication of a user device using emulated mag stripe wireless transmission, and in particular to smart phones or similar devices with transaction applications.

Credit, debit and other payment cards in the US are now issuing with both an embedded chip and a mag stripe. Smart phones and other devices can have the chip and/or an emulated mag stripe. Cards with a mag stripe and a chip use a service code (2xx) that indicates there is also chip capability. There are, and will be for many years, various types of Point of Sale (POS) terminals. The main ones are as follows.

Legacy mag stripe terminal. With legacy mag stripe card readers, there is no ability to switch to using the more secure chip for a transaction, even though the card or phone has such capability. Thus, the mag stripe or emulated mag stripe is processed as an ordinary mag stripe transaction. It would be desirable to make use of the dynamic authentication capabilities of a chip on legacy mag stripe readers.

Combination chip card and swipe terminals. When the user swipes the mag stripe in a Point of Sale (POS) reader with both, the reader detects a 3-digit service code (xxx). If the service code is 1xx, that indicates a mag stripe only card, and the card is processed accordingly. If the service code is 2xx, that indicates the card has chip capabilities. If the card has been swiped as a mag stripe, and a 2xx service code is detected, the reader will display a prompt to the user to insert the card so the chip can be read, which is a more secure transaction.

Contactless terminal. A contactless terminal works with smart phones and other devices with wireless Near Field Communication (NFC) and chip capability. They may or may not support mag stripes, and thus support mag stripe emulation. The terminal is constantly transmitting, and a phone with a payment application will detect this transmission and respond to begin a transaction.

In typical payment systems using a smart phone or similar device, a consumer enrolls with a mobile app running on a user's mobile device (e.g., cell phone, tablet computer, etc.). The enrollment process involves the user supplying a user's card information and user information. The user information can be used to create a mobile wallet. The card information can be used to communicate with the user's bank/financial institution associated with the card (card Issuer). Such a communication can involve one or more rounds of message exchanges for purposes of identification and verification. Further, the communication can also include exchange of digital tokens for authentication. When the consumer performs a transaction at a point of sale, the transaction can be NFC-based or alternately, a non-NFC-based transaction. A non-NFC-based transaction, for example, can be a magnetic stripe transmission.

Samsung's "Samsung Pay" service works with many existing magnetic strip payment terminals (except, for example, those that require detecting an actual card in the slot). If a terminal doesn't have NFC contactless capability, then using Samsung Pay service, it can leverage a Mobile Secure Transmission (MST) transaction, which emulates a swipe transaction through the swipe reader on the terminal. That's an alternative way to make a contactless transaction at a traditional magnetic stripe reader which allows a card is to be dipped in/swiped inside a slot. Apple Pay® and Google's Android Pay™, on the other hand, use contactless NFC technology. In addition to MST, Samsung Pay™ also provides NFC-based transactions with POS terminals that are NFC-capable. Both Samsung Pay and Apple Pay leverage the power of tokenization, in which a user's card details are "provisioned" onto a smart device (without the card details being actually stored on the phone) and at no point is that card information given to the merchant as part of the transaction.

Android Pay generates a 16 digit token (same length as a card number) in the cloud, and transmits it to the phone, which then provides it to the POS. Samsung Pay uses either NFC or mag stripe emulation—Magnetic Secure Transmission (MST), and thus can work with legacy readers. A 16 digit token is provided, similar to Android Pay. A fingerprint or PIN is required to use the payment application. In spite of the extra security provided by Samsung Pay, the legacy card reader thinks it is a mag stripe, and the receiving banking network treats it like a mag stripe. This means, under new regulations adopted in October 2015, the merchant is liable for fraudulent card use, since the merchant hasn't upgraded to a chip-reader POS.

More details are useful to understand the invention. The stripe on the back of a credit/debit card is a magnetic stripe, often called a magstripe. The magstripe is made up of tiny iron-based magnetic particles in a plastic-like film. Each particle is typically a tiny bar magnet about 20-millionths of an inch long. The magstripe can be "written" because the tiny bar magnets can be magnetized in either a north or a south pole direction. There are three tracks on the magstripe. A magstripe reader can understand the information on the three-track stripe. Each track is about one-tenth of an inch wide. The ISO/IEC standard 7811, which is used by banks, specifies: 1) Track one is 210 bits per inch (bpi), and holds 79 6-bit plus parity bit read-only characters, 2) Track two is 75 bpi, and holds 40 4-bit plus parity bit characters, and 3) Track three is 210 bpi, and holds 107 4-bit plus parity bit characters. Credit card issuers typically use only tracks one and two for transactions. Track three is a read/write track (which includes an encrypted PIN, country code, currency units and amount authorized), but its usage is not standardized among banks.

The format for track two, developed by the banking industry, is as follows:
Start sentinel—one character
Primary account number—up to 19 characters
Separator—one character
Expiration date or separator—four characters or one character
Service Code—three characters
Card Discretionary data—enough characters to fill out maximum record length (40 characters total)
LRC—one character The Card Discretionary data can include PIN data, CVV data, and additional discretionary data. A chip card includes data that is similar to a magnetic stripe card, typically referred to as Track 2 and Track 1 equivalent data. In particular, the layout for chip Track 1 and Track 2 equivalent magnetic stripe data is similar to that of a magstripe card, with one notable difference, the replacement of some of the data fields (the issuer discretionary data) with dynamically introduced values. The chip on the card allows calculation of a dynamic card verification value (dCVV) based on a card-unique derived key and a simple application transaction counter (ATC) and potentially data from the terminal, whenever possible or applicable. The dynamic card verification value is passed in the track 1 or track 2 equivalent data in the issuer discretionary data field and sometime even in the same location that was used for the original card verification value. The application transaction counter (ATC) is also inserted in the area reserved on the track layout for issuer discretionary data. The dynamic card verification value enhances the security of the transaction versus the static card verification value/code or card ID (CVV/CVC/CID) used in magnetic stripe transactions. The use of dynamic data in the transaction prevents replay attacks (no transaction can be done twice) and card cloning or skimming (the card key never leaves the protection of the smart card memory).

Traditionally, in a contactless mode, there can be two modes of operation, a Mag Stripe Data (MSD) mode and an EMV mode[1]. In the MSD mode, following the interaction between the payment instrument and the terminal, the transaction is processed using the existing and legacy magstripe rail including the delivery of the track 1 data as a core part of the authorization request. Although the MSD mode is not the most secure mode, it nevertheless has a great benefit of easier implementation and could be deployed with minimal changes on the merchant and the acquirer infrastructure. The MSD mode currently exists for most of the payment networks implementation including Amex, Discover, MasterCard, Visa, JCB and Union Pay.

[1] EMV (Europay MasterCard Visa), is a technical standard for smart payment cards and for payment terminals and automated teller machines which can accept them. EMV cards are smart cards (also called chip cards or IC cards) which store their data on integrated circuits rather than magnetic stripes, although many EMV cards also have stripes for backward compatibility.

In the EMV mode, the chip solution uses additional data elements including data from the terminal to calculate cryptographic values (cryptograms) that are intended to protect and secure the transaction but nevertheless require the development of a new path to deliver the additional data. It is for that reason that the EMV implementation requires more significant changes on the merchant and the acquirer infrastructure to support the EMV mode. The MSD mode uses what is usually being referred to as the dCVV (dynamic Card Verification Value) while the EMV mode uses the notion of the Cryptogram. The majority or the contactless infrastructure deployed in the US is based on the MSD mode and hence as the U.S. migrates to EMV, the payments infrastructure will need to continue to support contactless MSD for some period of time to allow acceptance of existing contactless cards and devices, while adding support for contactless EMV. Generally speaking, contactless EMV cards are also known as chip cards.

A POS terminal is equipped with a magnetic stripe interface and a chip interface supporting contact or contactless. According to preferred standards in the financial industry, a party that does not provide chip support takes liability for any resulting card-present counterfeit fraud losses. If both parties do not support chip, existing rules apply, i.e. the liability is on the issuer. Thus, for example, if an issuer of a card provides chip support, but a merchant doesn't provide chip support, then the merchant takes liability. A merchant is required to comply with the rules of the financial industry, and thus there is some incentive for the issuer to move the liability of a transaction to a merchant.

The difference is between chip cards and magnetic stripe cards as far as track data goes is the difference in the Service Code of these two types of cards. The Service Code is a 3 digit number. In particular, the Service Code for a chip-enabled card starts with a 2 indicating to the terminal reading the magnetic stripe that the card is chip-enabled and should be treated accordingly if the terminal is able to support the chip rules. For magstripe only cards, the Service Code starts with a 1.

The Service Code can thus be represented as 1XX or 2XX. If a service code of 1XX is detected, the data will be forwarded as mag stripe data, which has a lower level of security. If a 2XX code is detected by a POS that supports a chip reader, additional data can be read to improve the security of the data.

The 2XX Service Code thus indicates a more secure transaction because either a secure element is present (Apple phones) or the phone receives keys from a server and has other restraints to make the transmission more secure (Android, Samsung phones). A secure element (SE) is a tamper resistant Smart Card chip that facilitates the secure storage and transaction of payment and other sensitive credentials, e.g., a secure element stores tokens, keys, and chip data. A secure element card can be used in both a contactless and a contact mode. A secure element utilizes uniquely-derived cryptographic keys for providing security to transactions. A secure element can be included within a debit or credit card. In some scenarios, a secure element can also be included within a mobile phone, e.g., as a part of a NFC stack inside a mobile phone. In some other elements, a secure element can be included within a chip card. Thus, a payment device can be any electronic device with an embedded chip, e.g., a chip card, a tablet, a watch, a wearable electronic device, a mobile phone, etc.

HCE (Host Card Emulation), enables NFC devices to perform contactless transactions in card emulation mode without a secure element. The payment credentials and payment application are stored, like other applications, on the phone but not in a secure element. HCE allows the NFC controller to route communication from the contactless reader or POS terminal to an HCE service on the mobile device's host CPU. In HCE, the payments application resides on the phone's operating system and interacts with the cloud system and the NFC controller directly. There is no need for a card issuer to use SIM or other secure element for making contactless NFC mobile payments.

MST (Magnetic Secure Transmission) generates an alternating current through an inductive loop of changing magnetic fields. The signal received from the device emulates the same magnetic field change as a magnetic stripe card when swiped across the same read head. In order to keep the transaction secure, MST only exists during the transmission process. MST does not require merchants to make changes to their existing payment systems.

BRIEF SUMMARY OF THE INVENTION

In one embodiment, the present invention provides a method and communication device with an emulated mag stripe capability. Information is transmitted in the mag stripe data indicating that the communication device has chip capability as well. This information is used by a server on the back-end (acquirer, issuer, network) to take advantage of that chip capability. For example, additional fields can be used for security measures and communication over the telecommunications network with the device can be performed to provide a more secure communication with a terminal. In one embodiment, the additional information is provided in the service code, using a unique 3 digit code other than 2xx.

In one embodiment, an MST transmission is attempted by the phone upon launch of a payment application. A legacy mag stripe terminal will send the data to the server. A terminal supporting both mag stripe and chip will normally read the service code, and tell the user to insert the chip card if there is a swipe with a service code (2xx) that indicates a chip capability. Since the service code of this embodiment does not begin with a "2," the terminal will not make such a prompt and instead will send the data to the remote server. A contactless terminal without a mag stripe reader will not detect the emulated mag stripe, but will send an initiation message to attempt to initiate communication with the payment application on the user device. Upon detection of such an initiation message, the payment application will discontinue the mag stripe emulation, and start an NFC communication with the terminal.

In one embodiment, the emulated mag stripe includes traditional mag strip data plus dynamic authentication data. In particular, dynamic card verification value (dCVV) based on a card-unique derived key and a simple application transaction counter (ATC) are included.

In one embodiment, a request for authorization of a MST transaction is sent to the user's phone. In the absences of a confirmation from the user, it is assumed the token was compromised and no authorization will be provided. Thus, a sniffing of the token, similar to mag stripe skimming, will be defeated. Because the user is using the phone for the MST transaction, there is little risk the user will not have the phone or not see and respond to the challenge sent to the phone, as might be the case for a card transaction. In one embodiment, the first transaction with a token is allowed without a challenge, but if there is a subsequent request with the same token, the second attempt is blocked. Alternately, a passive verification can be used, such as requiring the payment application (or wallet) in the phone to send location, time or other data that can be correlated with the location and time or other data received from the POS device requesting authorization.

In one embodiment, where a request for authorization comes from a transit terminal, the entry is allowed without authorization to allow timely entry. The token includes or is mapped to the user's phone number, allowing a challenge to the phone while the user is in the transit system, or location-based or other passive verification. The token is subsequently authorized, and if denied, the card number is put on a black list to deny departure from the transit system.

DETAILED DESCRIPTION OF THE INVENTION

Figure 1:
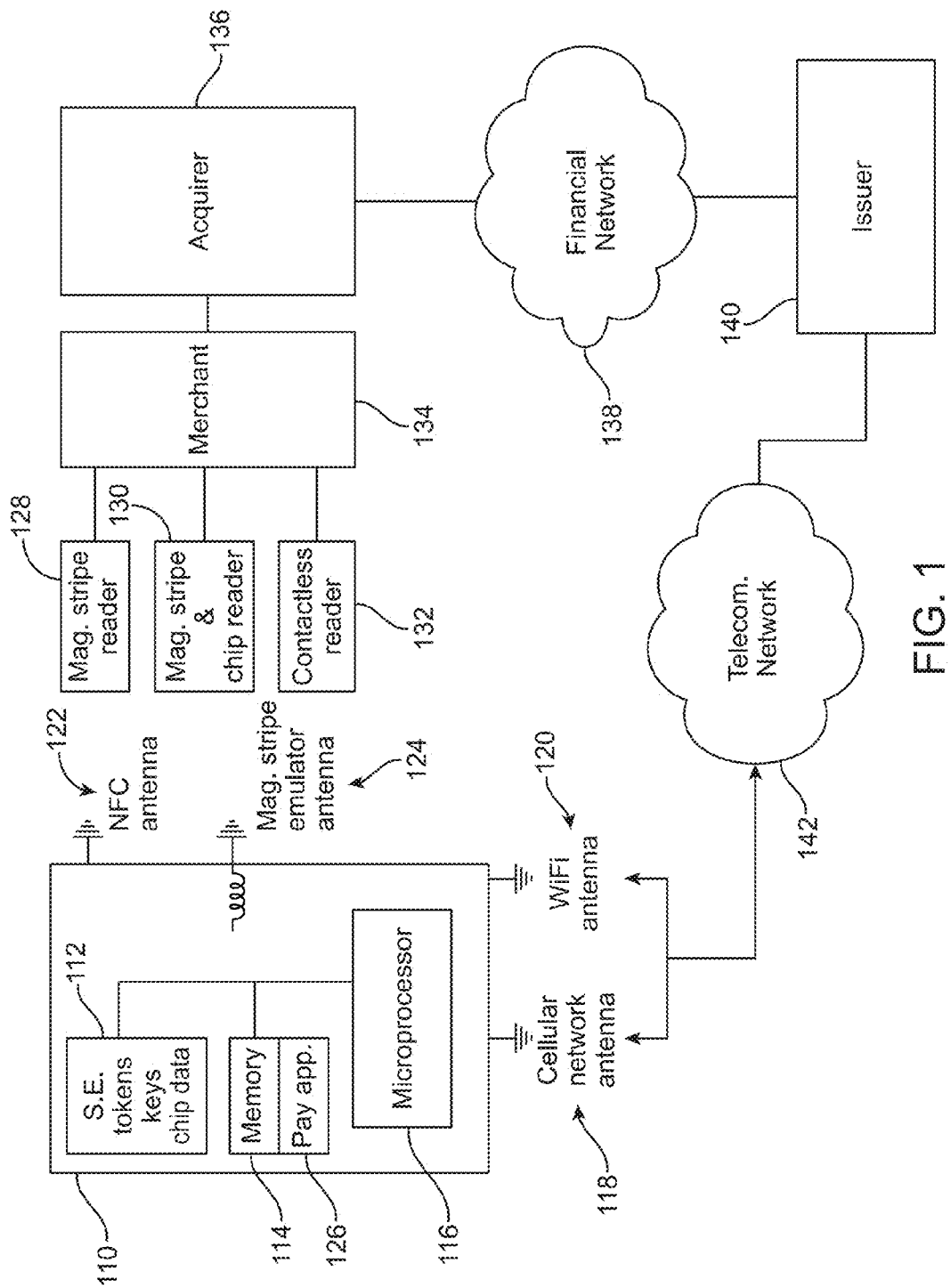
FIG. 1 is a block diagram of an electronic communication system according to one embodiment of the invention.

FIG. 1 is a block diagram of an electronic communication system according to one embodiment of the invention. A smartphone 110 includes a Secure Element (SE) 112 with encrypted data in some brands of smartphones, while in other smartphones this data is in a normal memory or is not present. SE 112 contains user financial data, including account numbers, encryption keys, tokens, authentication data, etc. A general memory 114 is also provided, along with a microprocessor 118. The smartphone includes four antennas: a cellular antenna 118, a WiFi antenna 120, an NFC antenna 122 and a mag stripe emulator antenna 124. Physically, these antennas may share components in some embodiments.

Memory 114 includes a payment application 126. Using the payment application, a user of the smart phone 110 can interact with multiple types of terminals. In particular, a magstripe reader terminal 128, a magstripe and chip reader 130, and a contactless reader 132. Magstripe emulation antenna 124 will be used to interact with terminals 128 and 130, while NFC antenna 122 will be used to interact with contactless reader terminal 132.

The terminals are connected to a merchant server 134 which in turn communicates over a network, such as the Internet or a telecommunications network, to an acquirer server 136. Acquirer server 136 is connected through a financial network 138 to an issuer server 140. In operation, magstripe and other data received by the terminals is provided through the merchant, acquiring and financial network to the issuer server. The issuer will then send a response, either authorizing or not authorizing the transaction, back through the financial network, acquirer and merchant to the terminal. Also, issuer 140 may communicate through a telecommunications network 142 to smart phone 110 to request additional information, such as with a challenge—response, in connection with a transaction authorization. The response would return using either cellular antenna 118 or Wi-Fi antenna 120, through the telecommunications network 142 to issuer server 140.

Mag Stripe Terminals

Figure 2:
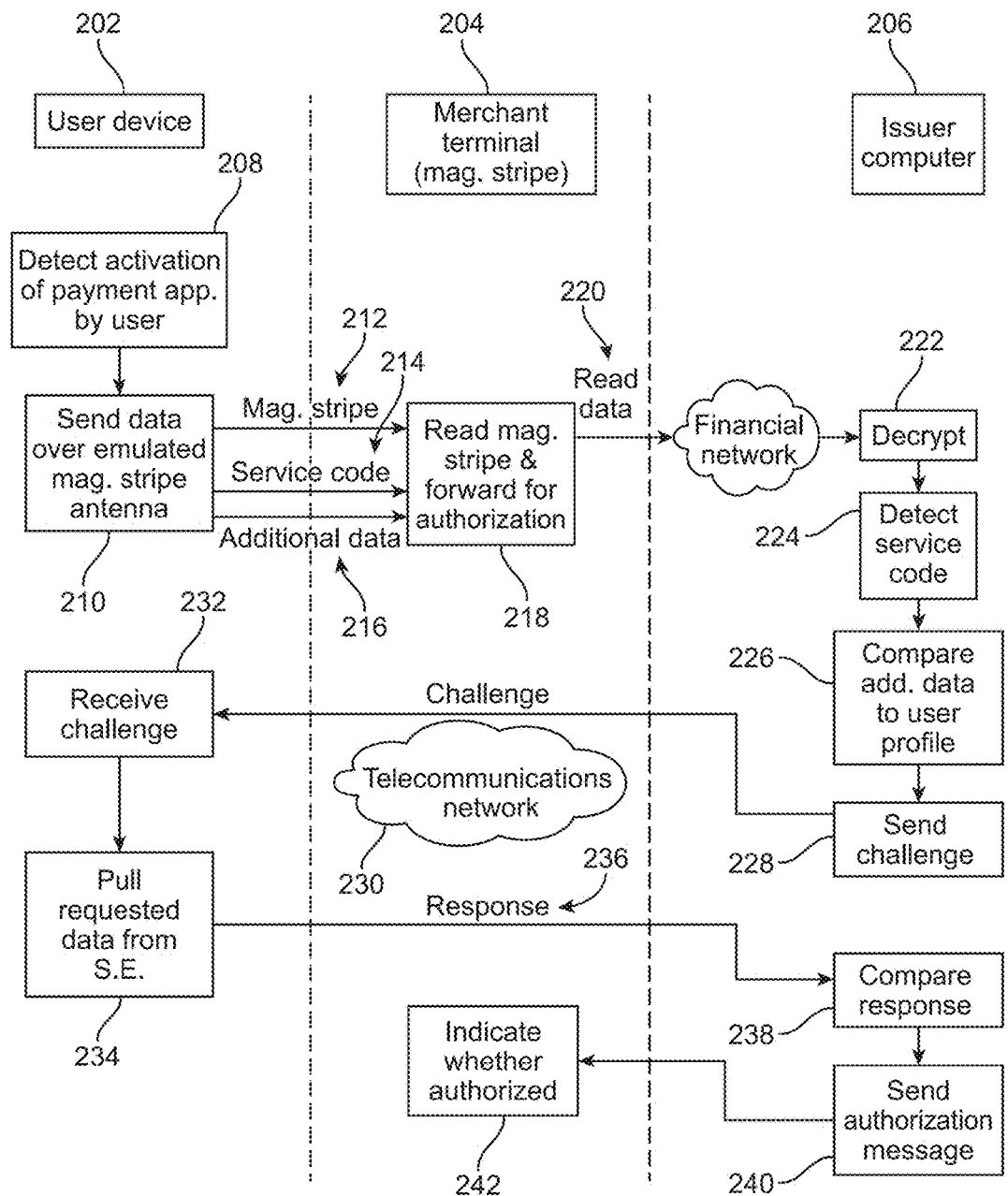
FIG. 2 is a flow chart illustrating the interaction with mag stripe terminals and issuers according to one embodiment of the invention.

FIG. 2 is a flow chart illustrating the interaction with mag stripe terminals and issuers according to one embodiment of the invention. FIG. 2 shows actions taken by a user device 202, a merchant terminal 204 with magstripe capability and an issuer computer 206. It will be understood that there are intervening steps to traverse the networks shown in FIG. 1, and other steps, but these are not included in FIG. 2 for sake of clarity. User device 202 will have a payment application downloaded to it. For example, the user device can be a smart phone, tablet or other device. When the user desires to make a payment, the user will activate the payment application on the user device. The payment application will detect activation by the user in step 208. In response to the activation, a message is assembled including magstripe data, a unique service code, and additional data. This additional data in one embodiment is a dynamic authentication value.

The data is then sent over an emulated magstripe antenna (step 210). As shown, the data includes the magstripe data 212, service code 214 and additional authentication or other data 216. This data is received by the merchant magstripe reader (step 218).

As described above, a legacy magstripe reader will simply read and forward the read data 220 to issuer computer 206 through the merchant, acquirer and financial network is shown in FIG. 1. A new model reader which includes both magstripe and chip capability will check the service code to see if it begins with a two, indicating a chip enabled card. Since the service code does not begin with the two, it will not display a prompt for the user to insert a chip card.

Issuer computer 206 will receive the read data 220 and perform any necessary decryption, including decryption of a token (222). The service code within will be detected (224). Upon recognizing that the service code indicates a user device with chip capability, the additional chip data will be read and compared to data in a stored user profile (226). Optionally, the issuer computer may additionally, or instead, send a challenge (228) over a telecommunication network 230 to the user device.

User device 202 will receive the challenge from the telecommunication network (step 232). The received challenge will be provided to the payment application, which will then pull the requested data from memory, which may be in a secure element (step 234). Alternately, the challenge may require the dynamic generation of data. A response (236) is sent over telecommunication network 230 to issuer computer 206. Issuer computer 206 will then compare the response to the stored, appropriate answer (238). Issuer computer will then send an authorization message upon a favorable comparison (240). The authorization message will authorize a transaction if there's a match, otherwise an authorization fail message will be sent. Upon receiving the authorization message, merchant terminal 204 will indicate on a display or otherwise whether authorization was successful or failed (step 242).

Contactless Terminal

Figure 3:
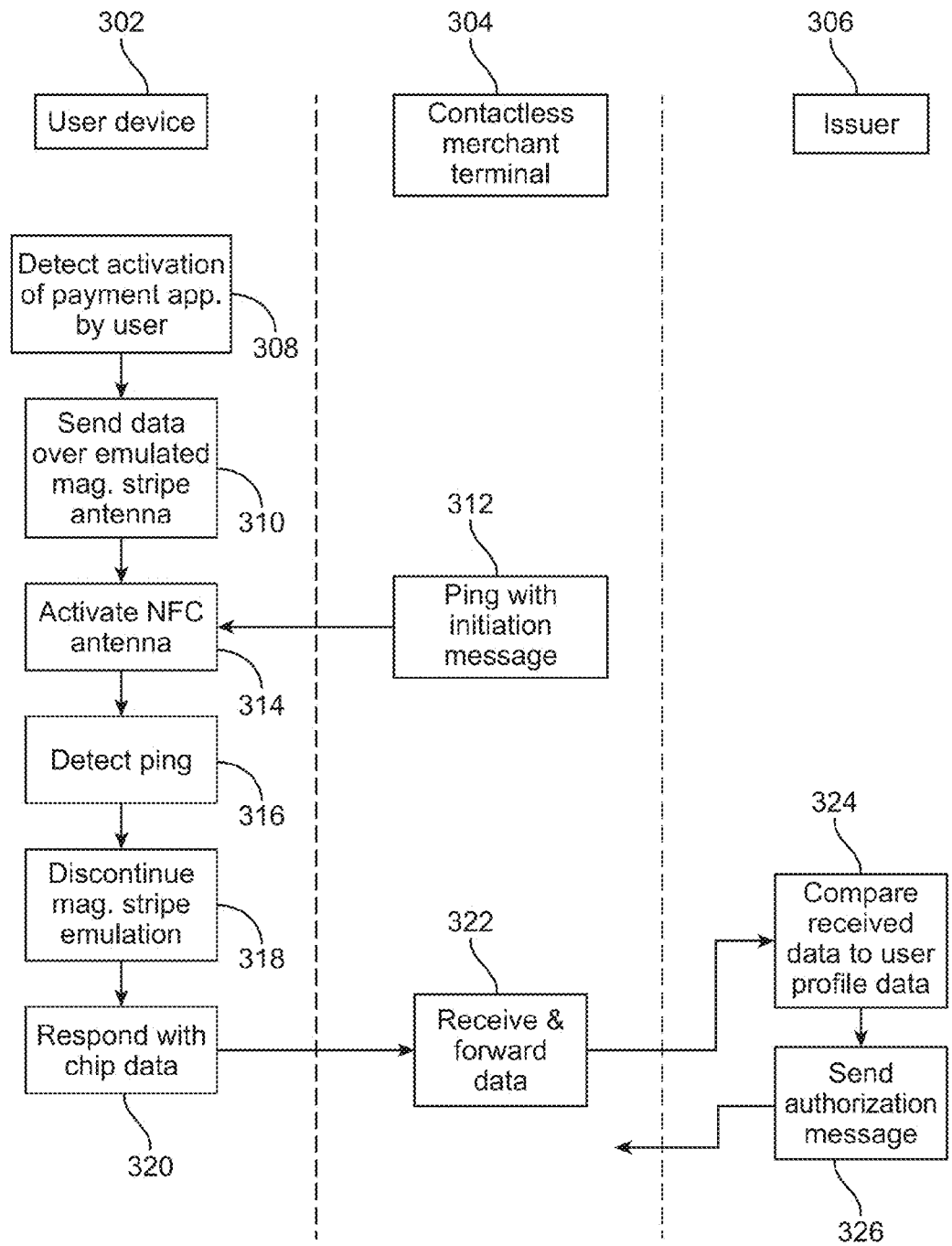
FIG. 3 is a flow chart illustrating the interaction with a contactless terminal and issuers according to one embodiment of the invention.

FIG. 3 is a flow chart illustrating the interaction with a contactless terminal and issuers according to one embodiment of the invention. Shown are the interactions between a user device 302, a contactless merchant terminal 304, and an issuer 306. The user device detects activation of the payment application by the user (308). As in FIG. 2, the magstripe and other data is transmitted using an emulated magstripe antenna (310). In the meantime, contactless merchant terminal 304 will not detect the magstripe because it does not have the magstripe reader. Instead, it is periodically pinging any nearby card or user device with an initiation message (312). User device 302 will either maintain the NFC antenna activated, or activate the NFC antenna (314). If no ping is detected, the NFC antenna will be deactivated. This step can apply equally to the process shown in FIG. 2. If the ping is detected (316), the magstripe emulation is discontinued (318). Instead, the chip data is transmitted using the NFC antenna 122 of FIG. 1 (320).

Contactless merchant terminal 304 will receive the chip data and forward it to the issuer (322). Issuer 306 will receive the data and compare it to be stored data (324). In particular, the chip data can include a dynamic value, such as a dynamic card verification value (dCVV) or an application transaction counter (ATC). The user device and issuer both calculate a dynamic value from the same user data. Upon detecting a match, issuer 306 provides an authorization message (326) to merchant terminal 304. Optionally, a challenge can be sent over the telecommunications network as in the process of FIG. 2.

In one embodiment, other dynamic authentication values can be provided in the chip data. For example, the time and amount of the last transaction can be provided. Alternately, or in addition, the merchant for the last transaction can be provided, or the location of the current transaction can be provided. The issuer can then challenge the user device over the telecommunications network for its current location to compare. Optionally, in addition to receiving and evaluating the dynamic authentication data, the issuer can send a challenge to the user device as in the process of FIG. 2.

Figure 4A:
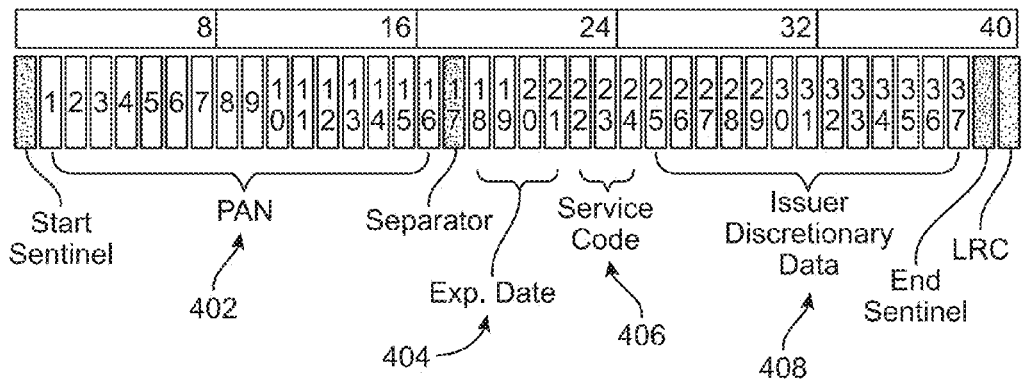
FIG. 4A is a diagram of the mag stripe track 2 data layout.

FIG. 4A illustrates a sample mag stripe track 2 layout, as modified by an embodiment of the present invention. A PAN field 402 includes the Primary Account Number, or a token. This is followed by an expiration date field 404. Next is a 3 digit service code 406. In one embodiment, the service code begins with a 3, or another number other than 1 or 2. Alternately, the last two digits of the service code can be used to indicate chip capability. Issuer discretionary data field 408 follows. This includes a dCVV, APC, or other dynamic value.

Transit Terminal

Figure 4B:
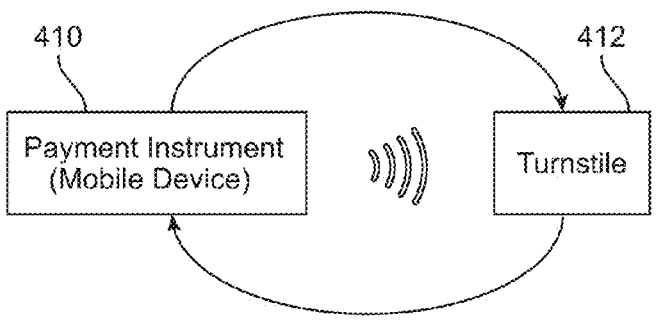
FIG. 4B is a diagram of a transit terminal communication according to an embodiment of the invention.

FIG. 4B illustrates an embodiment using a transit terminal. A user device 410 wirelessly communicates with a card terminal in a turnstile 412. Like the contactless terminal process described in FIG. 3 above, the user device will be pinged by the terminal and will respond as described in FIG. 3. However, authorization will either be local, or will not occur until the user reaches an exit turnstile. In one embodiment, if the user device is authorized, no action is taken. Alternately, the authorization is sent through the telecommunication network to the payment application on the phone. The authorization code will be appended to the data sent to the exit terminal at the exit turnstile. If the user device is not authorized, the user token, PAN, or other identifier is added to a blacklist that is downloaded to all the exit terminals reachable from the indicated entry terminal, or a central database accessible by those terminals, either locally or remotely. Then, upon the user attempting to exit, the exit turnstile can quickly determine it is not allowed. Alternately, a non-authorization is sent to the payment application, or simply the absence of sending an authorization prevents the user from exiting.

According to some embodiments, embodiments of the present disclosure facilitate a payment device such as a mobile phone for use in a turnstile at a transit system. For example, a consumer presents his or her phone to the turnstile. In some embodiments, the mobile phone provides the consumer's mobile phone number as part of the chip data (in the secure element) or an identifier (that can be mapped to the consumer's mobile phone number) to allow the back end system to recognize the consumer's mobile phone number. In some embodiments, if tokenization is performed on the consumer's mobile phone number, the tokenized information can be used to identify the mobile device for which the token was issued. In some exemplary aspects, the software running on the turnstile can use a white/black list as a first line of defense to identify blocked/allowable consumers based on their phone numbers. Assuming that a consumer is allowed through, the turnstile initiates an authorization request. Thus, an authentication request is sent to the consumer's mobile application. The consumer's account can be put on a temporary hold until the consumer authenticates (no additional transaction could be conducted until that next step occurs), for example, using a mobile app running on the consumer's mobile phone. In some scenarios, if the consumer fails to authenticate, the consumer's account is put on a suspended mode and the consumer's mobile phone number is put on the black list. In some embodiments, the authentication from the consumer involves the consumer (equivalently, a mobile wallet or an app running on the consumer's mobile phone) responding with the ATC within a secure element. In some embodiments, the consumer authenticates every time a transit transaction is performed, or when the consumer uses the mobile app for making payments to the transit system. Upon receipt of proper authentication from a consumer, the temporary hold on the consumer's account can be released.

Alternate Embodiments

According to some embodiments, methods and systems of detecting a type of payment device (e.g., a phone, a tablet, a chip card, a watch), based on the provided PAN (primary account number), the tokenized account number or/and a combination of service code, dVCC and ATC is disclosed. (As will be understood, the dVCC is typically a function of ATC, a key, and a PAN.) Such detection can, for example, be performed by an issuer or a payment network (e.g., VISA or MASTERCARD). In some aspects, this involves the issuer/payment network pre-assigning codes and/or rules to identify to a type of payment device, and then determining, based on the dVCC and Service Code, a type of payment device. For example, if the issuer/payment network determines (e.g., based on transmissions from the secure element in the payment device) that the tokenized Primary Account Number corresponds to a MST transaction, and the key inside the secure element is a particular value (say "125" for a phone), a "127" for a tablet, etc.), then the payment device is a phone. This is an important information as now the Service Code could be coded with preassigned values that would indicate the form factor or type of the payment instrument used in the payment transaction. Given the limitation on the data fields, the Service Code would be implicitly indicating the set of keys to be used for verifying the dCVV as well as tracking the transaction counters (e.g., ATC) based on the form factor or type of payment instrument. Similarly, if the issuer/payment network determines (e.g., based on transmissions from the secure element in the payment device) that the tokenized Primary Account Number corresponds to a MST transaction, and the key inside the secure element is a particular value (say "127" for a tablet), whether the payment device is a tablet.

According to some embodiments, a method of enhancing the security of a transaction is disclosed. For example, the back end (i.e., the issuer/payment network) can inform a mobile wallet (and, accordingly, a consumer) that a transaction has been completed. Such a functionality can involve programming the secure element within a payment device. In some exemplary aspects, a mobile wallet can, in response, inform the back end with the ATC value and a time of the transaction. In some exemplary aspects, unless a mobile wallet responds back to the back end, no additional transactions are allowed to be performed. The mobile wallet, as can be understood, can be a part of the Operating System of a consumer's mobile device. In some other scenarios, the mobile wallet can be a mobile app running on the consumer's mobile device.

In some embodiments, a mobile wallet can initiate a notification of a transaction to the back end. The notification can include additional information. For example, a mobile wallet can inform the back end a location and a time of a transaction. Generally speaking, a mobile wallet can inform the back end with a context associated with the transaction. Thus, an issuer or a payment network can detect movement of the consumer vis-à-vis a location of the transaction.

In some aspects, in addition to informing the back end of a transaction, a mobile wallet can encrypt and sign the data being transmitted to the back end. In some aspects of the present disclosure, the signature is based on a cryptographic key which depends on a context and/or the ATC. In some embodiments, the back end can ping the mobile wallet for additional information, e.g., similar to a challenge/response scenario. For example, the back end can pose a challenge to the mobile wallet for providing the signature of the previous two transactions performed. Unless the mobile device responds back to the back end with the correct information, no additional transactions are allowed.

Figure 5:
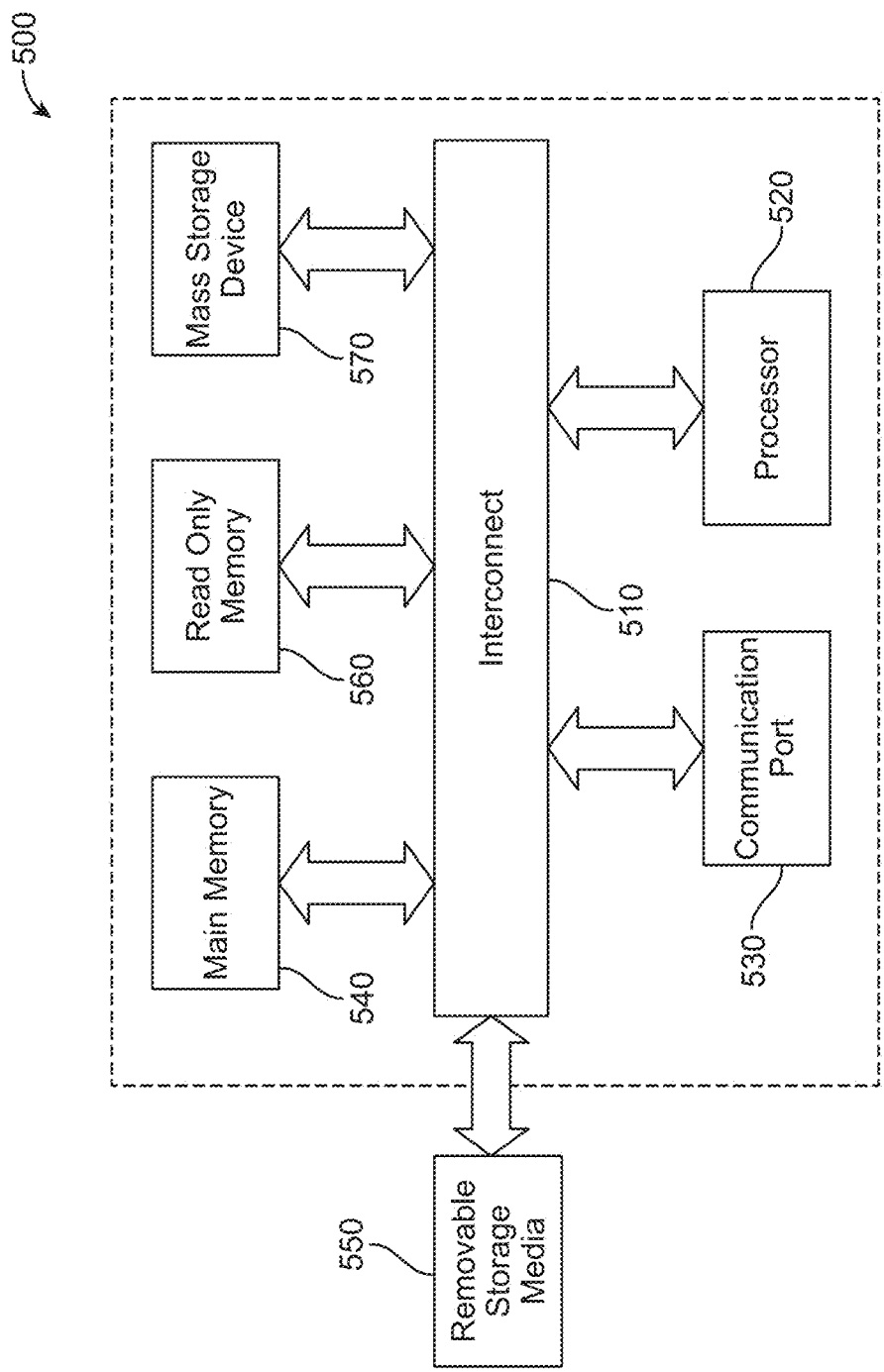
FIG. 5 is a diagram of a computer system for implementing a user device, merchant terminal and/or issuer and acquirer servers according to an embodiment of the invention.

FIG. 1 through FIG. 4B illustrate several exemplary methodologies associated with embodiments of the present disclosure. Embodiments of the present disclosure include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 5 is an example of a computer system 500 with which embodiments of the present disclosure may be utilized. According to the present example, the computer system 500 includes an interconnect 510, at least one processor 520, at least one communication port 530, a main memory 540, a removable storage media 550, a read only memory 560, and a mass storage device 570.

Processor(s) 520 can be any known processor. Communication port(s) 530 can be or include, for example, any of an RS-232 port for use with a modem-based dialup connection, a 10/100 Ethernet port, or a Gigabit port using copper or fiber. The nature of communication port(s) 530 may be chosen depending on a network such a Local Area Network (LAN), Wide Area Network (WAN), or any network to which the computer system 500 connects.

Main memory 540 can be Random Access Memory (RAM), or any other dynamic storage device(s) commonly known in the art. Read only memory 560 can be any static storage device(s) such as Programmable Read Only Memory (PROM) chips for storing static information such as instructions for processor 520.

Mass storage device 570 can be used to store information and instructions. For example, hard disks such as the Adaptec® family of SCSI drives, an optical disc, an array of disks such as RAID, such as the Adaptec family of RAID drives, or any other mass storage devices may be used.

Interconnect 510 can be or include one or more buses, bridges, controllers, adapters, and/or point-to-point connections. Interconnect 510 communicatively couples processor(s) 520 with the other memory, storage, and communication blocks. Interconnect 510 can be a PCI/PCI-X or SCSI based system bus depending on the storage devices used.

Removable storage media 550 can be any kind of external hard-drives, floppy drives, Compact Disc Read-Only Memory (CD-ROM), Compact Disc-Re-Writable (CD-RW), Digital Video Disc Read-Only Memory (DVD-ROM).

The components described above are meant to exemplify some types of possibilities.

In no way should the aforementioned examples limit the disclosure, as they are only exemplary embodiments.

Terminology

Brief definitions of terms, abbreviations, and phrases used throughout this application are given below.

The terms "connected" or "coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to some embodiments," "in the embodiments shown," "in other embodiments," "embodiments," and the like generally mean the particular feature, structure, or characteristic following the phrase is included in at least one embodiment of the present disclosure, and may be included in more than one embodiment of the present disclosure. In addition, such phrases do not necessarily refer to the same embodiments or different embodiments.

If the specification states a component or feature "may," "can," "could," or "might" be included or have a characteristic, that particular component or feature is not required to be included or have the characteristic.

The term "responsive" includes completely or partially responsive.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules, or a module can include one or more application programs.

The term "network" generally refers to a group of interconnected devices capable of exchanging information. A network may be as few as several personal computers on a Local Area Network (LAN) or as large as the Internet, a worldwide network of computers. As used herein, "network" is intended to encompass any network capable of transmitting information from one entity to another. In some cases, a network may be comprised of multiple networks, even multiple heterogeneous networks, such as one or more border networks, voice networks, broadband networks, financial networks, service provider networks, Internet Service Provider (ISP) networks, and/or Public Switched Telephone Networks (PSTNs), interconnected via gateways operable to facilitate communications between and among the various networks.

Also, for the sake of illustration, various embodiments of the present disclosure have herein been described in the context of computer programs, physical components, and logical interactions within modern computer networks. Importantly, while these embodiments describe various embodiments of the present disclosure in relation to modern computer networks and programs, the method and apparatus described herein are equally applicable to other systems, devices, and networks as one skilled in the art will appreciate. As such, the illustrated applications of the embodiments of the present disclosure are not meant to be limiting, but instead are examples. Other systems, devices, and networks to which embodiments of the present disclosure are applicable include, for example, other types of communication and computer devices and systems. More specifically, embodiments are applicable to communication systems, services, and devices such as cell phone networks and compatible devices. In addition, embodiments are applicable to all levels of computing from the personal computer to large network mainframes and servers.

In conclusion, the present disclosure provides novel systems, methods, and arrangements for a financial instrument platform. While detailed descriptions of one or more embodiments of the disclosure have been given above, various alternatives, modifications, and equivalents will be apparent to those skilled in the art without varying from the spirit of the disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof. Therefore, the above description should not be taken as limiting.

What is claimed is:

1. A computer readable medium embedded on a mobile device and having non-transitory computer readable code with instructions for:

reading traditional mag stripe data from a memory of the mobile device;

updating a dynamic authentication value stored in the memory of the mobile device;

providing, from the mobile device to a terminal, a value other than 2 to begin a service code to avoid having the terminal detect that the mobile device has a chip capability and prompt a card entry;

assembling, in the mobile device, the mag stripe data, dynamic authentication value, and indication of chip capability into a data package;

activating a mag stripe emulation antenna of the mobile device; and modulating, by the mobile device, a signal for the mag stripe emulation antenna with the data package.

2. The computer readable medium embedded on a mobile device of claim 1 further comprising non-transitory computer readable code with instructions for:

reading, at the mobile device, a received challenge from an issuer for additional information, the received challenge being received at a telecommunications antenna of the mobile device over a telecommunications network;

pulling the additional information from the memory of the mobile device; and composing, in the mobile device, a response to the received challenge with the additional information.

3. The computer readable medium of claim 1 wherein the indication of chip capability comprises a service code beginning with a number other than 1 or 2.

4. The computer readable medium of claim 1 wherein the dynamic authentication value comprises a dynamic card verification value.

5. The computer readable medium of claim 1 wherein the dynamic authentication value comprises an application transaction counter.

6. The computer readable medium embedded on a mobile device of claim 1 further comprising non-transitory computer readable code with instructions for:

storing, in the memory of the mobile device, additional information regarding a transaction with the terminal;

pulling the additional information from the memory of the mobile device; and composing, in the mobile device, a message with the additional information; and sending the message from a telecommunications antenna of the mobile device over a telecommunications network.

7. The computer readable medium embedded on a mobile device of claim 6 wherein the additional information is stored in a mobile wallet in the memory of the mobile device.

8. The computer readable medium embedded on a mobile device of claim 6 wherein the additional information is a transaction counter stored in the memory of the mobile device.

9. The computer readable medium embedded on a mobile device of claim 6 wherein the additional information includes data used to identify a mobile phone number of the mobile device.

10. A method for operating a mobile device comprising:

reading traditional mag stripe data from a memory of the mobile device;

updating a dynamic authentication value stored in the memory of the mobile device;

providing, from the mobile device to a merchant terminal, a value other than 2 to begin a service code to avoid having the terminal detect that the mobile device has a chip capability and prompt a card entry;

assembling, in the mobile device, the mag stripe data, dynamic authentication value, and indication of chip capability into a data package;

activating a mag stripe emulation antenna of the mobile device; and modulating, by the mobile device, a signal for the mag stripe emulation antenna with the data package.

11. The method of claim 10 further comprising:

reading, at the mobile device, a received challenge from an issuer for additional information, the received challenge being received at a telecommunications antenna of the mobile device over a telecommunications network;

pulling the additional information from the memory of the mobile device; and composing, in the mobile device, a response to the received challenge with the additional information.

12. The method of claim 10 wherein the indication of chip capability comprises a service code beginning with a number other than 1 or 2.

13. The method of claim 10 wherein the dynamic authentication value comprises a dynamic card verification value.

14. The method of claim 10 wherein the dynamic authentication value comprises an application transaction counter.

15. The method of claim 10 further comprising:

reading, at an issuer computer, an authorization request with mag stripe data from the merchant terminal;

determining, at the issuer computer, that an originator of the mag stripe data has chip card capability from other than a service code beginning with a 2;

accessing, at the issuer computer, a user record corresponding to the mag stripe data;

calculating, at the issuer computer, a dynamic authentication value from the user record; and comparing, at the issuer computer, the calculated dynamic authentication value with a field in the mag stripe data.

16. The method of claim 15 further comprising:

assembling, at the issuer computer, a challenge using data from the user record;

sending, from the issuer computer, the challenge to the phone identified in the user record for the originator of the mag stripe data over a telecommunications network;

receiving, at the issuer computer, a response;

comparing, at the issuer computer, the response to a correct response associated with the user record; and sending, from the issuer computer, an authorization message to the merchant terminal.

17. A mobile device for communicating with a terminal, the mobile device comprising:

a memory in the mobile device storing traditional mag stripe data;

a mag stripe emulation antenna;

a processor configured to update a dynamic authentication value stored in the memory of the mobile device, provide a value other than 2 to begin a service code to avoid having the terminal detect that the mobile device has a chip capability and prompt a card entry, assemble the mag stripe data, dynamic authentication value, and indication of chip capability into a data package, activate the mag stripe emulation antenna, and modulate a signal for the mag stripe emulation antenna with the data package; and a telecommunications antenna for receiving a challenge from an issuer in response to the data package, the challenge being received at the telecommunications antenna of the mobile device over a telecommunications network;

the processor being further configured to pull additional information from the memory of the mobile device and compose a response to the received challenge with the additional information.

18. The device of claim 17 wherein the mobile device is a phone.

19. The device of claim 17 further comprising:

a secure memory element in the mobile device, wherein the additional information is stored in the secure memory element.

20. The device of claim 19 wherein the secure element is configured to dynamically generate the additional data.

* * * * *